United States Patent [19] [11] 4,126,928
Hoff [45] Nov. 28, 1978

[54] METHOD OF MAKING A SHAFT ASSEMBLY
[75] Inventor: Stephen J. Hoff, Richmond, Ind.
[73] Assignee: Hoffco, Inc., Richmond, Ind.
[21] Appl. No.: 788,357
[22] Filed: Apr. 18, 1977
[51] Int. Cl.² .............................................. B23P 9/00
[52] U.S. Cl. ..................................... 29/445; 64/2 R; 29/455 R; 138/149
[58] Field of Search ............. 29/455 R, 445; 138/149; 64/2 R

[56] References Cited
U.S. PATENT DOCUMENTS

| | | | |
|---|---|---|---|
| 529,216 | 11/1894 | Tatham | 138/149 |
| 1,601,099 | 9/1926 | Arens | 64/2 R |
| 2,962,051 | 11/1960 | Burkes | 138/149 |
| 3,299,417 | 1/1967 | Sibthrope | 29/455 X |
| 3,343,250 | 9/1967 | Berto et al. | 29/455 X |
| 3,958,582 | 5/1976 | Noda et al. | 138/149 |
| 3,977,078 | 8/1976 | Pittinger | 138/149 |

Primary Examiner—Charlie T. Moon
Attorney, Agent, or Firm—Jenkins, Coffey & Hyland

[57] ABSTRACT

A drive and frame shaft assembly for a lawn trimming tool or the like, having a bent portion to dispose the tool end of the assembly at an angle to the head end thereof. A curved assembly of a frame shaft and sheath for a flexible drive shaft is formed by, first, assembling onto a straight rigid sheath tube an elongated thick-walled cylindrical bushing of semirigid plastic material over the length of the sheath tube which is subsequently bent, together with a plurality of annular metal spacers at fixed points along the length thereof which is to remain straight and securing the bushing and spacers in place as with tape and by flaring ends of the sheath tube; second, inserting such sheath tube assembly in a close-fitting frame-shaft tube; and third, subjecting the assembled sheath tube and frame-shaft tube to a bending operation in which the bending action is applied to the outer frame shaft tube and the semirigid plastic bushing transmits bending forces therefrom to the sheath tube contained therein so as to bend the sheath tube and maintain it substantially concentric within the frame shaft tube over the bent length of the assembly.

15 Claims, 9 Drawing Figures

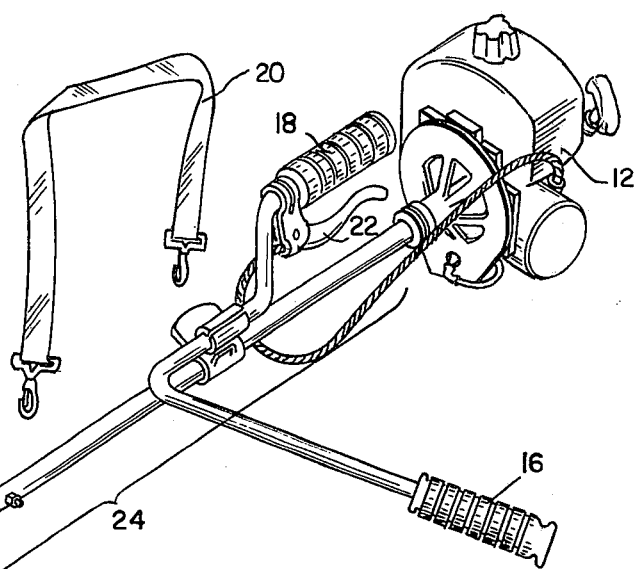
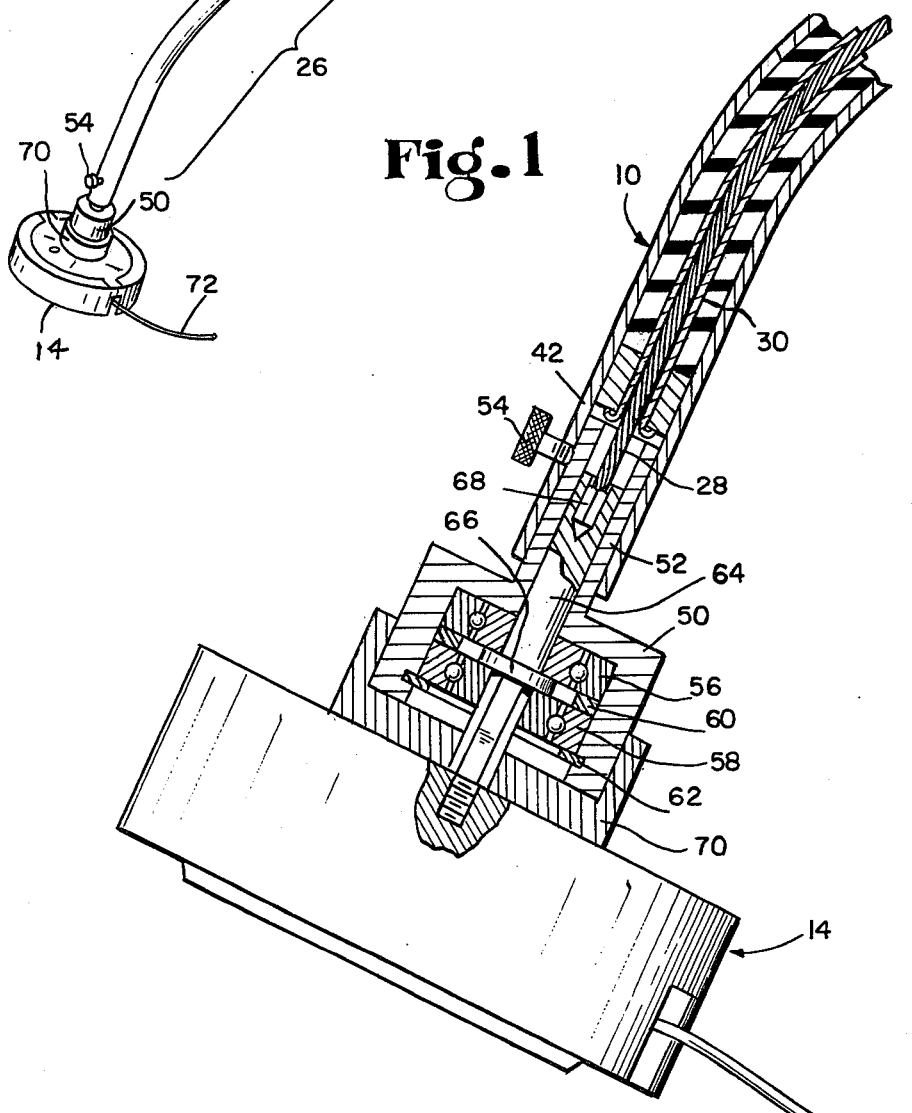
Fig. 1
Fig. 8

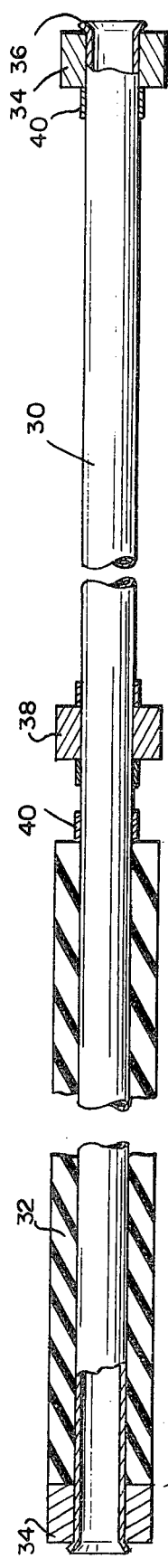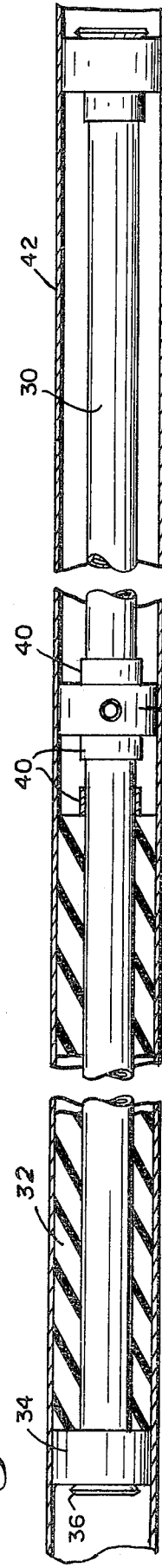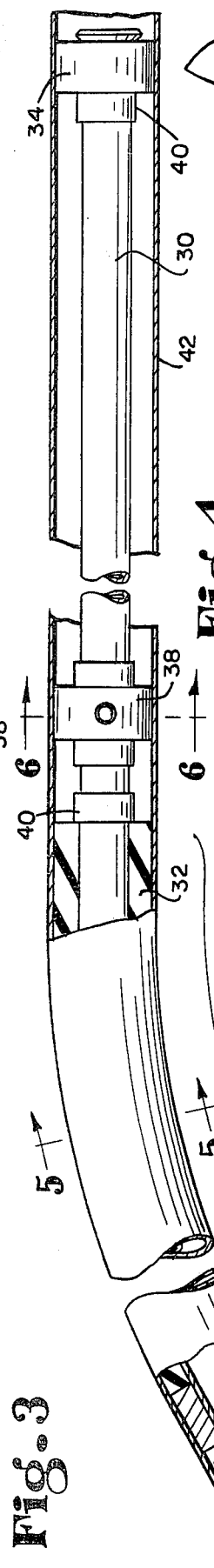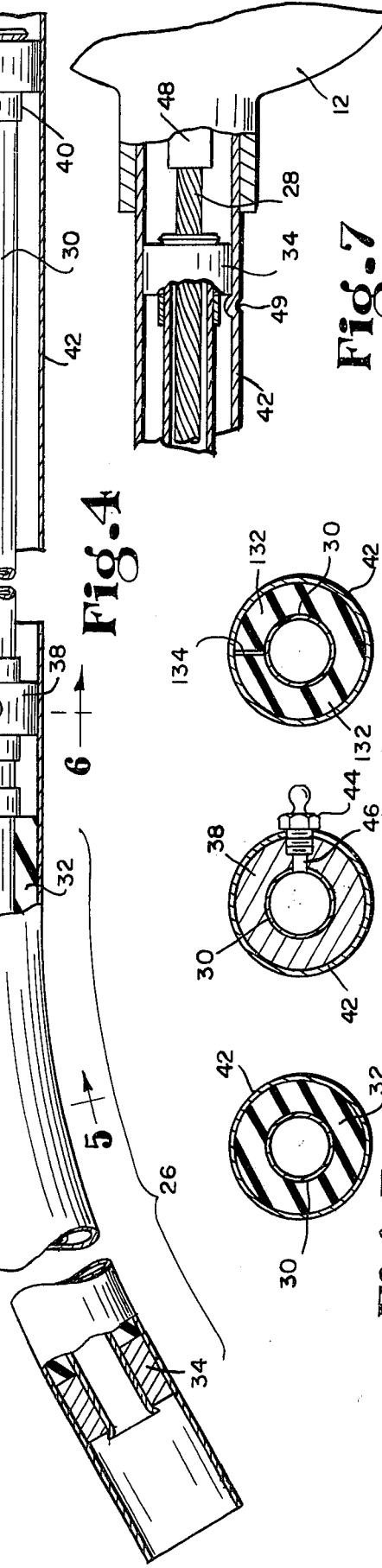

METHOD OF MAKING A SHAFT ASSEMBLY

BACKGROUND OF THE INVENTION

This invention relates to frame shaft and drive shaft assemblies, and more specifically, to a combined curved frame shaft and sheath for a flexible drive shaft, for use in low horsepower implements such as lawn trimming tools, brush cutters, and the like, in which the shaft assembly is bent to dispose its tool end at an angle to its power input end and power is transmitted through the assembly by a flexible drive shaft.

Various low-horsepower manual implements such as lawn edgers, brush cutters, and the like are available on the market, in which a tubular frame shaft connects a power head at its upper end to a driven tool at its lower end and in which power is transmitted from the head to the tool by a rotating shaft extending through the frame shaft. When such implements carry a rotating cutter or other tool, it is desirable to dispose the tool axis of rotation at an angle to the axis of the tool head and upper portion of the frame shaft, in order to permit the implement to be carried comfortably by an operator in an erect standing or walking position. Such angular relationship has been provided by bending the lower portion of the frame shaft through a suitable arc, and by transmitting power from the power head to the tool by means of a flexible drive shaft contained in a flexible sheath extending through the frame shaft. Commonly, such sheath is formed of a helically wound tape. The sheath has been held generally concentric with the frame shaft by a series of spaced annular bushings.

This arrangement has not been entirely satisfactory In particular, the flexible sheath does not sufficiently hold the flexible drive shaft against distortion and whipping, which produces vibration and wear. Under some circumstances, the flexible sheath for the drive shaft will fail, so that it becomes unwound or enlarged and no longer constrains the drive shaft for rotation on its axis. This results in failure of that shaft and hence of the implement as a whole. The configuration of the shaft assembly, with a long straight portion and adjoining arcuate portion, has heretofore required the use of a flexible sheath and prevented the use of a rigid sheath.

The present invention overcomes the problems and disadvantages of the prior art and provides a shaft assembly of the desired bent configuration in which the rotating flexible drive shaft is firmly and closely supported throughout its length by a rigid sheath.

SUMMARY OF THE INVENTION

In accordance with the invention, a combined curved frame shaft and casing or sheath for a flexible drive shaft is formed by, first, assembling onto a straight length of rigid sheath tubing a thick-walled cylindrical bushing of semirigid material over the length of the sheath which is subsequently bent, together with spacer bushings at the ends of the sheath tube and at spaced points along the length of the sheath which is to remain straight; second, inserting such sheath tube assembly in a straight length of frame-shaft tube; and third, subjecting the resulting assembly of sheath tube and frame shaft tube to a bending operation, as in conventional tube-bending apparatus. In such operation, the bending action is applied to the outer frame shaft tube and the semirigid bushing transmits the bending action to the sheath tube contained therein.

The semirigid bushing is desirably an extruded length of plastic material, such as polyvinyl chloride polymer, and any of various known materials may be used to provide a bushing of sufficient stiffness to support the sheath during bending but of sufficient flexibility to permit the desired bending. The spacer bushings may be of any desired material, and I have found it convenient to use molded bushings of powdered iron.

It is of course necessary that the bushings remain in their desired positions both during the assembly and bending steps and in the completed assembled product. Desirably, the bushings may be held in place for manufacturing purposes by securing them to the sheath tube with adhesive tape and by flaring the ends of the sheath tube. After the bending step has been completed, the elongated thick-walled bushing will extend about the bend and will be secured by contact with the walls of the tubes. It will then also serve to hold adjacent spacer bushings in place. Other spacer bushings are desirably locked in place by suitable attachments or deformations of the outer frame shaft tube. One such spacer bushing is desirably positioned adjacent the midpoint of the shaft assembly and secured in place by a grease fitting threaded through the outer frame tube into the spacer bushing and connected to the interior of the sheath tube.

The frame shaft and sheath tube assembly produced as described above will comprise a rigid outer tubular frame shaft extending from a head end to a tool end and including a curved portion. Such frame shaft will contain a sheath tube of rigid tubing material, such as steel or other metal, extending through the tubular frame shaft and held concentric therewith by the elongated semirigid bushing over the bent portion of the frame shaft and by the spacer bushings at its ends and at one or more spaced points along the length of the straight portion of the frame shaft. Since the sheath tube is itself rigid, few such spacer bushings are needed, and are desirably used only at the ends of the straight section. The bushings and tubes are so interconnected that the parts are all held in predetermined relationship for use. In use, a flexible drive shaft is inserted in the sheath tube and the shaft assembly is provided with a power head at its upper end and a tool fitting at its lower end. The flexible drive shaft operatively connects the power head to the tool, and is rigidly supported throughout its intervening length by the rigid sheath tube and for rotation on its axis in such supporting sheath tube.

BRIEF DESCRIPTION OF THE DRAWINGS

The accompanying drawings illustrate the invention. In such drawings:

FIG. 1 is a perspective view of a weed cutting implement having a shaft assembly in accordance with this invention;

FIG. 2 is a longitudinal section of a subassembly showing a first stage of assembly in accordance with the invention;

FIG. 3 is a longitudinal section showing a second stage of assembly;

FIG. 4 is a longitudinal section showing a completed shaft assembly in accordance with the invention;

FIG. 5 is an enlarged vertical section taken on the line 5—5 of FIG. 4;

FIG. 6 is an enlarged vertical section taken on the line 6—6 of FIG. 4;

FIG. 7 is a longitudinal section showing connection of the shaft assembly to a power head;

FIG. 8 is a longitudinal section showing connection of the shaft assembly to a tool; and FIG. 9 is a section like FIG. 5 but showing a modified semirigid bushing.

DETAILED DESCRIPTION OF THE PREFERRED EMBODIMENT

The implement shown in FIG. 1 is a lawn trimmer, and is representative of implements in which shaft assemblies in accordance with the present invention are especially useful. Such lawn trimmer comprises a shaft assembly 10 having a gasoline engine 12 as its power head at the upper end of such assembly 10, and a rotating lawn cutting tool 14 at the lower end of such assembly 10. Shaft assembly 10 is fitted with handles 16 and 18 by which the implement may be carried and may be provided with a strap 20 by which it may be hung from the shoulders of the operator. The handle 18 carries a throttle lever 22 for controlling the power head 12. The shaft assembly 10 comprises a long straight upper portion 24 which is coaxial with the power head 12, and a lower bent portion 26 which is bent through an arc sufficient to dispose the axis of the tool 14 at an angle to the upper portion 24 of the shaft assembly such as to dispose the cutter tool 14 for rotation in a substantially horizontal plane when the implement is in a convenient carrying position when the operator is in an upright standing or walking position. Power is transmitted from the power head 12 to the tool 14 through the shaft assembly 10 by a drive shaft which must be flexible in view of the necessary bent portion 26 of the shaft assembly. Such a flexible shaft 28 requires close support in a sheath or casing throughout its length, and especially over the bent portion of the shaft assembly.

In accordance with the present invention, the drive shaft assembly 10 is made in a series of steps or stages shown in FIGS. 2–4. The assembly starts with a straight length of sheath tube 30. This is a rigid tube of strong material such as steel, which is suitably cut to length. Over the length of the tube 30 which is eventually to be bent, there is placed an elongated thick-walled cylindrical bushing 32 of semirigid material. This is desirably an extruded seamless tube of semirigid plastic material of sufficient stiffness to support the sheath tube 30 during the bending operation described below but of sufficient flexibility to permit such bending operation. The bushing 32 is desirably somewhat longer than the length 26 over which the bending will occur, so that it extends at least partway into the adjoining straight sections of the final assembly. The lower end of the bushing 32 may extend close to the lower end of the sheath tube 30, and such sheath tube 30 desirably carries a rigid spacer bushing 34 at that lower end. The spacer bushing is a rigid bushing of metal or the like, and may be made as a molded bushing of powdered iron or other metal. The lower end of the sheath tube 30 is flared outward, so that the spacer bushing 34 is trapped between the flare 36 and the thick-walled bushing 32.

The opposite end of the sheath tube 30 likewise carries a rigid spacer bushing 34, and the end of the tube is flared outward to retain that bushing in place. Adjacent the opposite end of the portion 24 of the sheath tube 30 which is to be straight in the final assembly, there is another spacer bushing 38 of the same rigid metal construction as the spacer bushings 34. There may be additional spacer bushings 38 along the straight length of the sheath tube 30, as considered necessary or desirable depending upon the length and rigidity of that straight section of the sheath tube. In this first stage of assembly as shown in FIG. 2, the end spacer bushings 34 will be held against removal from the sheath tube 30 by the flares 36. For assembly purposes, the several bushings 32, 34, and 38 may be held in place by pieces of adhesive tape 40 applied to the sheath tube 30 against the faces of the bushings.

As a second step in the manufacture of the shaft assembly 10, the subassembly shown in FIG. 2 is inserted in an outer tubular frame shaft 42, which will be somewhat longer than the sheath tube 30 so as to provide for attachment to the power head and tool at its opposite ends. The frame shaft 42 is desirably of lightweight metal, such as aluminum, and is of a size suitable to provide the necessary physical strength and other characteristics necessary or desired for its purposes as the main shaft of the implement shown in FIG. 1. The several bushings 32, 34, and 38 will of course be of a size to fit snugly within the frame shaft 42, so that they will hold the sheath tube 30 coaxial with that frame shaft 42 in the subassembly shown in FIG. 3.

The second stage assembly shown in FIG. 3 is then bent to the desired configuration for the implement in which it is to be used. Such bending is performed on conventional tube-bending equipment which applies bending forces to the outer frame tube 42 over the length of its bent portion 26. These forces bend the outer frame tube 42 and are transmitted from that outer tube 42 by the thick-walled semirigid bushing 32 to the sheath tube 30, so that that sheath tube 30 is bent simultaneously with and on substantially the same radius as the outer tube 42.

After the assembly has been bent to the condition shown in FIG. 4, a spacer bushing intermediate the length of the assembly, here shown as the bushing 38, is fixed in place by mounting a grease fitting into that bushing through the wall of the outer frame tube 42, as shown in FIG. 6. A hole 46 is first drilled through the frame tube 42 at a predetermined position so that it extends through the bushing 38 and into the sheath tube 30. The outer end of the hole 46 is threaded, and a grease fitting 44 is threaded into that hole, so that it is engaged with the threads in the spacer bushing 38. As shown in FIG. 7, to permanently fix the upper end spacer bushing 34 in place, a local area of the frame shaft 42 is deformed inward to form a dimple 49 immediately adjacent the side of that spacer bushing 34. The bushing will then be held between that dimple 49 and the flare 36 at the upper end of the sheath tube 30. At the lower end of the sheath tube 30, the lower spacer bushing 34 is trapped between the end flare 36 and the end of the thick-walled bushing 32 which now extends about the curved portion 26 of the assembly and is thereby tightly held against movement.

For use of the shaft assembly 10 as shown in FIG. 4, a flexible drive shaft 28 is inserted in the sheath tube 30. The shaft and tube will have a close running fit, in accordance with conventional practice in connection with flexible drive shafts. The upper end of the drive shaft 28 is provided with a suitable end fitting 48 for attachment to the drive shaft of the power unit 12, as shown in FIG. 7.

The lower end of the shaft assembly 10 is connected to a tool as shown in FIG. 8. An output fitting 50 is mounted by means of a tubular shank 52 in the open lower end of the tubular frame shaft 42, and may be replaceably held by a thumb screw 54. In the tool mounting shown, the outlet fitting 50 forms a housing for two coaxial spaced ball bearings 56 and 58. These are spaced apart by a ring spacer 60 interposed between their outer races, and they are held in the housing by a snap ring 62 engaged in a peripheral groove. A shaft 64 is mounted in the bearings 56 and 58. Such shaft carries a peripheral flange 66 trapped between the inner races of the ball bearings 56 and 58 and is thereby held axially in the fitting. The upper end of the shaft 64 contains a squared hole which receives a squared end member 68 on the flexible drive shaft 28. The lower end of the shaft 64 carries a cup washer 70 and has a threaded end on which the cutter tool 14 is mounted. The cutter tool 14 has one or more cutting elements 72 projecting from its periphery. Such elements 72 may be made of mono filament plastic strand which at high speed rotation will serve as a cutting element to trim lawn and weeds.

The shaft assembly produced as described above comprises an outer frame shaft 42 which provides the strength and other characteristics necessary and desired for its purposes as a frame shaft in an implement of the type described. A rigid sheath tube 30 will be contained within that frame shaft and held concentric therewith by the rigid spacer bushings 34 and 38 at its ends and over its straight portion 24. Over the curved portion 26 of the frame shaft 42, the sheath tube 30 will be held substantially concentric with the frame tube by the semirigid bushing 32, and will be smoothly curved along the curve of the frame tube. Accordingly, the sheath tube 30 will provide firm guidance and control of the rotating flexible shaft 28 throughout substantially its entire length, so as to confine that shaft to rotation on its axis and prevent vibration and whipping and resulting wear. The assembly provides substantially longer life and less chance of failure than did the prior art assembly containing a flexible, helically-wound sheath.

An alternative form of semirigid thick-walled bushing is shown in FIG. 9. Whereas the bushing 32 shown in FIG. 5 is a circumferentially continuous, thick-walled tube, the bushing 132 shown in FIG. 9 is similar except that it includes an axial slit 134 along its length. Such a slit 134 may facilitate manufacture of the thick-walled tube to uniform thickness, and may be used in place of the circumferentially-continuous bushing 32 and in substantially the same manner.

I claim:

1. The method of making a shaft assembly comprising a rigid elongated frame tube for physically connecting a driving head at one end to a driven tool at the other end, said tube being bent so as to dispose the driven tool on an axis at an angle to the axis of the driving head, and a bendable rigid sheath tube of substantially smaller diameter than said frame tube extending generally concentrically through the bent frame tube for closely containing a flexible drive shaft for drivingly connecting the driving head to the driven tool, which method comprises assembling onto a straight length of bendable sheath tube an elongated, thick-walled tubular continuous bushing of semirigid material, said bushing closely surrounding the sheath tube and extending along the length of the sheath tube which is later to be bent, inserting the resulting subassembly, together with a spacer bushing at each end of the sheath tube, in an enclosing outer shaft tube extending over the whole length of such subassembly and closely surrounding the said spacer bushings and continuous bushing, thereafter subjecting the resulting final assembly of shaft tube and subassembly to a bending operation so as to bend the shaft tube over a length of the assembly in which the sheath tube is surrounded by the continuous semirigid bushing, and thereby cause the semirigid bushing to transmit bending force to the sheath tube while maintaining the sheath tube substantially concentric with the shaft tube over the bent length thereof, and leaving the semirigid bushing in place in the bent assembly to support the sheath tube in use.

2. The method of claim 1 in which the bent length of the assembly is adjacent one end of the frame tube and the continuous semirigid bushing is placed in substantially abutting relation with the spacer bushing at that end of the frame tube in the subassembly.

3. The method of claim 1 with the addition of at least temporarily securing spacer bushings in place on the sheath tube, and subsequently treating the final assembly to secure one or more of the spacer bushings against displacement relative to the outer shaft tube.

4. The method of claim 1 in which the semirigid bushing is of plastic material.

5. The method of claim 1 in which the shaft assembly includes a straight portion and the continuous bushing extends over the length of the sheath tube which is to be bent and the subassembly includes bushing means along the portion of the tube which is to remain straight.

6. The method of claim 5 in which said bushing means comprises one or more rigid bushings at points spaced from the end bushings.

7. The method of claim 1 in which the subassembly includes a rigid spacer bushing at or adjacent each end of the elongated semirigid bushing.

8. The method of claim 5 in which the semirigid bushing is a length of extruded thermoplastic tubing.

9. The method of making a shaft assembly as for connecting a driving head to a driven tool on an axis at an angle to the axis of the driving head, which comprises assembling onto a straight length of bendable sheath tube an elongated, thick-walled tubular continuous bushing of semirigid material along the length of the sheath tube which is later to be bent, a rigid spacer bushing at each end of the sheath tube, and bushing means along the portion of the sheath tube which is to remain straight, securing the spacer bushings at the ends of the sheath tube against removal by flaring the outer ends of the sheath tube, inserting the resulting subassembly in an enclosing outer shaft tube extending over the whole length of such subassembly and closely surrounding the said bushings and bushing means, and thereafter subjecting the resulting final assembly of shaft tube and subassembly to a bending operation so as to bend the shaft tube over a length of the assembly in which the sheath tube is surrounded by the continuous semirigid bushing, and thereby cause the semirigid bushing to transmit bending force to the sheath tube while maintaining the sheath tube substantially concentric with the shaft tube over the bent length thereof.

10. The method of claim 9 with the addition of locally deforming the outer shaft tube in the final assembly adjacent one of the end spacer bushings so as to trap such bushing between an end flare on the sheath tube and the local deformation of the shaft tube.

11. The method of making a shaft assembly as for connecting a driving head to a driven tool on an axis at an angle to the axis of the driving head, which comprises assembling onto a straight length of bendable sheath tube an elongated, thick-walled tubular continuous bushing of semirigid material along the length of the sheath tube which is later to be bent, a rigid spacer bushing at each end of the sheath tube, and bushing means along the portion of the sheath tube which is to remain straight, inserting the resulting subassembly in an enclosing outer shaft tube extending over the whole length of such subassembly and closely surrounding the said bushings and bushing means, thereafter subjecting the resulting final assembly of shaft tube and subassembly to a bending operation so as to bend the shaft tube over a length of the assembly in which the sheath tube is surrounded by the continuous semirigid bushing, and thereby cause the semirigid bushing to transmit bending force to the sheath tube while maintaining the sheath tube substantially concentric with the shaft tube over the bent length thereof, said method also including the step of locally deforming the outer shaft tube of the final assembly at the location of one or more spacer bushings to secure the same against displacement.

12. The method of making a shaft assembly as for connecting a driving head to a driven tool on an axis at an angle to the axis of the driving head, which comprises assembling onto a straight length of bendable sheath tube an elongated, thick-walled tubular continuous bushing of semirigid material along the length of the sheath tube which is later to be bent, a rigid spacer bushing at each end of the sheath tube, and bushing means along the portion of the sheath tube which is to remain straight, inserting the resulting subassembly in an enclosing outer shaft tube extending over the whole length of such subassembly and closely surrounding the said bushings and bushing means, thereafter subjecting the resulting final assembly of shaft tube and subassembly to a bending operation so as to bend the shaft tube over a length of the assembly in which the sheath tube is surrounded by the continuous semirigid bushing, and thereby cause the semirigid bushing to transmit bending force to the sheath tube while maintaining the sheath tube substantially concentric with the shaft tube over the bent length thereof, said method also including the step of forming a grease hole through the outer shaft tube, an underlying spacer bushing and the sheath tube, and mounting a grease fitting in such hole to secure the bushing in place.

13. The method of making a shaft assembly having an outer shaft tube and an inner sheath tube for a flexible drive shaft, and having an arcuate portion, which comprises assembling within a prefabricated straight length of rigid but bendable outer shaft tube: a straight length of rigid but bendable sheath tube of substantially smaller diameter than the shaft tube and disposed coaxially therewith, and bushing means interposed between the inner and outer tubes in closely fitting relation with both and including a prefabricated length of thick-walled continuous tubular bushing or semirigid material extending over the length of the tubes which are to form the arcuate portion of the assembly, and subjecting the resulting straight assembly to a bending operation to form the arcuate portion of the assembly, in which the bending forces are applied to the outer shaft tubing and the semirigid bushing transmits bending forces therefrom to the sheath tube to bend the same while maintaining the sheath tube substantially concentric with the shaft tube, and leaving the semirigid bushing in place to support the sheath tube in use.

14. The method of claim 13 with the addition that said bushing means includes rigid spacer bushings between the two tubes at or beyond the opposite ends of the continuous semirigid bushing.

15. The method of claim 14 with the addition that said bushing means include rigid spacer bushings adjacent the ends of the sheath tube.

* * * * *